June 9, 1953 P. F. M. GLOESS ET AL 2,641,698

DELAY LINE DECODER

Filed Nov. 1, 1949 2 Sheets-Sheet 1

INVENTORS
PAUL FRANCOIS MARIE GLOESS
LOUIS JOSEPH LIBOIS
By: Haseltine, Lake & Co.
AGENTS INVENTORS
PAUL FRANCOIS MARIE GLOESS
LOUIS JOSEPH LIBOIS
By: Hazeltine, Lake & Co.
AGENTS Patented June 9, 1953

2,641,698

UNITED STATES PATENT OFFICE 2,641,698

DELAY LINE DECODER

Paul François Marie Gloess and Louis Joseph Libois, Paris, France

Application November 1, 1949, Serial No. 124,772
In France November 13, 1948

10 Claims. (Cl. 250—27)

Telecommunication systems are known, so-called coded pulse modulation systems, wherein a periodic sampling is effected of the amplitude of the signal constituting the information to be transmitted, and wherein a correspondence is established between the amplitude of this sampling and an integer number which is then transmitted by means of groups of code pulses, each of which is capable of assuming two values, the value of each pulse corresponding to a digit of said integer number written according to a binary system of numeration. Intelligence signals of different amplitudes are thus represented by code pulse groups of different composition, each different composition corresponding to a different amplitude.

Such systems are applicable either to multiplex communications, in which case each group of code pulses is related to a channel signal, or to one channel communications.

Apart from this, the pulses constituting the group of coded pulses may be equally spaced and succeed one another in the order of the digits of the binary numeration which they represent, or transmitted with unequal intervals and in an order different from that of the binary digits they represent.

At the receiving end, a device, a so-called decoder, transforms the group of code pulses into a signal having a variable amplitude substantially proportional to the initial amplitude of the signal constituting the information to be transmitted.

According to the method which is the object of the invention, the decoding is obtained by individually and respectively delaying the various pulses which constitute a group of coded pulses by different delay times, so as to make them coincide at a predetermined instant in or after the duration of each such group. By then dividing their respective amplitudes each by a numerical factor corresponding to the rank of the pulse in the group, and adding the various such divided amplitudes, it is possible to obtain a signal of amplitude proportional to the initial amplitude of the signal before its coding. As the condition of coincidence can only exist during a short time interval in or after the duration of each group, before the arrival of signals of subsequent groups, it is necessary, for taking advantage of it, to provide for a means of making the addition of the divided amplitudes effective only during this short time interval. Such a function can obviously be performed by what is known in the technique as a "gating amplifier."

A more special object of the invention is a delay line decoder transforming the group of code pulses into amplitude modulated pulses, according to the above-mentioned method.

A still further object of the invention is a decoder including several delay lines associated with an equal number of gating amplifiers. By selecting, either manually or automatically, a particular delay line and a particular gating amplifier, it is possible to change at will the decoding method used. This is advantageous when it is desired to make frequent changes in the decoding method, for instance in a secret communication system.

The invention shall be described hereinafter on an example of embodiment chosen by way of indication and without limiting its generality. This description will be given in connection with the appended drawings, wherein.

According to one feature of the invention, a decoder comprises a delay line comprising a number of taps, regularly or irregularly spaced along the line, equal in number to the code elements, connected in parallel to the grid of an electron tube through resistances designed in such a manner that each code pulse figures with the binary value corresponding to its rank in the group of coded pulses, said tube receiving, on the other hand, at the end of the group of coded pulses, a releasing or gating signal and delivering on its anode, at that time, an amplitude modulated decoded pulse.

Figure 1:
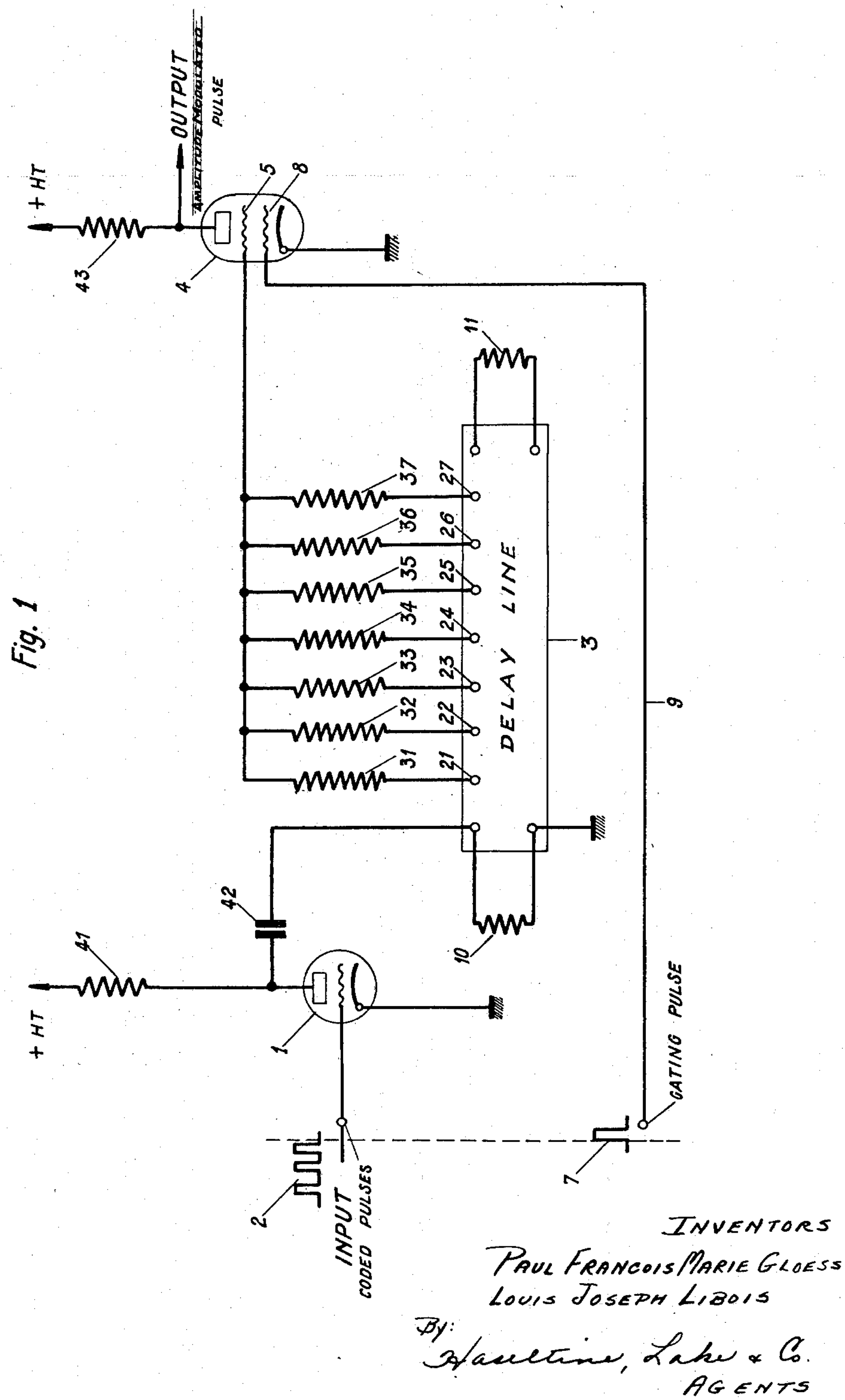
Figure 1 shows the electrical diagram of a decoder in accordance with the invention.

The decoder of Figure 1 comprises a first tube, normally biassed to the threshold of the anode current, which receives on its grid the coded signal pulses 2 with a positive polarity, a delay line 3, connected to the anode circuit of tube 1, and a second tube 4, one grid of which 5 is connected to taps on the delay line through $n$ resistance such as 31, arranged regularly or irregularly along the line, $n$ being the number of code elements. In the case, for instance, where the code selected has seven elements, regularly spaced in time by an interval $\theta$, there will be seven resistances 31 to 32 connected to taps 21 to 27, spaced by $\theta$ intervals along the line 3.

The operation of the decorder is as follows:

Shortly after the instant when the last pulse present (or not) of the code pulse group 2 has been applied to the grid of tube 1, the corresponding anode pulse transmitted to the line 3 determines (or not) an instantaneous voltage at the connection point 21 of the first resistance, marked 31, with the line 3. At the same instant, also, and taking into account the spacings of the taps, the other code pulses have determined (or not) voltage pulses, respectively, at the connection points of the other resistances.

Provided these various resistances are adjusted to the correct values, there is obtained, at that instant, a combined signal on the grid 5 of tube 4, whose amplitude corresponds precisely to the level of the signal defined by the code combination considered, provided the values of the resistances 31 to 37 be chosen according to suitable relationships. These relationships can in a general manner be expressed by a system of $n$ linear equations between $n$ variables, said system of equations expressing the fact that the potential divider constituted on one side by the resistance $R_k$ of rank $k$ and, on the other side, by all remaining resistances in parallel combined with the resistance equivalent to the delay line, has a suitable dividing ratio. The precise calculation of the $R_k$'s will be dealt with later on.

As regards the calculation of the resistances such as 31 to 37 it will be noted that if the characteristic resistance of the delay line is assumed to be low with respect to said resistances and if the attenuation of the line is ignored, then $$\frac{u_n}{u_{n-1}}=\frac{R_{n-1}}{R_n}$$

calling $u_n$ the amplitude of the pulse appearing at the top of resistance $R_n$, (a point common to the various resistances) and consequently, if the pulses are coded in the binary system and are transmitted beginning with those which represent the binary units of the highest order, the resistances 31 to 37 will decrease from left to right, according to powers of 2. In practice, of course, these resistances will be determined by adjustment.

A releasing or gating signal 7 is applied to a second grid 8 of tube 4, at an instant slightly later than the end of the group of code pulses 2, through the connection 9, and releases the tube, previously biassed to the plate current threshold.

The amplitude of the anode current pulse of the tube 4, being determined by the instantaneous voltage of the grid 5 thus represents the level of the transmitted signal which can then be selected and demodulated by usual means in the case, generally considered, of a multiplex communication by means of pulses. In the case of a one channel transmission system, it will be sufficient to arrange a low pass filter in the anode circuit of the tube 4 to obtain the low frequency signal transmitted as known in the art for demodulating amplitude modulated pulses.

It may be convenient, for preserving the quality of the signals, to linearize the characteristics of tube 4, for instance by means of a negative feedback by cathode resistance.

The line 3 will of course be matched at its two ends, by resistances 10 and 11, so as to avoid any unwanted reflection of the signals, and, further, it may be calculated for a relatively high iterative attenuation, so as to still decrease the risks of crossstalk by a lagging of the signals from one decoding operation to the next.

In the example shown, the tube 1 will be, preferably, a pentode tube, and the tube 4 a mixer tube with two negative grids.

Approximate values of resistances 31 to 37 may be calculated as follows:

Assuming the characteristic resistance of the delay line to be a low one, for instance 500 ohms, and the values of the resistances 31 to 37 to be rather high ones, for instance of the order of magnitude of 10,000 to 1,000,000 ohms, and if, at a given instant a given voltage is present at any point such as 21, the corresponding voltage $u_k$ at 5 is equal to that voltage divided by a number which is equal to the dividing ratio of a potential divider comprising on one side a resistance such as 31 and on the other side the combination in parallel of all the remaining resistances such as 32 to 37, provided that the characteristic resistance and attenuation of the delay line be negligible, at least in a first approximation. If the said given voltage $u$ is present at any point of rank $k$ of the series 21 to 27, and designating by $R_k$ the resistance corresponding to said point of rank $k$, let the resistance constituted by all other resistances $R_1, R_2 \ldots R_{k-1}, R_{k+1} \ldots, R_n$ in parallel be designated as $P_k$. Thus:

$$\frac{1}{P_k}=\frac{1}{R_1}+\frac{1}{R_2}+\cdots+\frac{1}{R_{k-1}}+\frac{1}{R_{k+1}}+\cdots+\frac{1}{_N}$$

or $$\frac{1}{P_k}=\sum_{i=1}^{i=n}\frac{1}{R_i}-\frac{1}{R_k}$$

In the latter expression, $$\sum\frac{1}{R_i}$$

is a fixed quantity, independent of $k$, and can be dsignated by $$\frac{1}{P}$$

Thus:

$$\frac{1}{P_k}=\frac{1}{P}-\frac{1}{R_k}$$

Hence:

$$\frac{u}{u_k}=\frac{R_k+P_k}{P_k}=\frac{R_k}{P}$$

whereby it is possible to calculate the various $R_k$'s by assuming P to have an arbitrary value high enough compared with that of the characteristic resistance of the delay line, and the various $$\frac{u}{u_k}$$

to have predetermined values which depend upon the code selected. For instance, in the binary code, $$\frac{u}{u_k}=2^k$$

and $$R_k=P_k 2^k$$

In practice, of course, the exact values of the resistances $R_k$ will be determined by adjustment in order to take due account of the factors otherwise neglected.

The above calculation further shows that the device, the object of the invention, may be applied to the decoding of codes with a basic number other than 2, or even for decoding signals according to a law slightly different from that used in the coding, for instance for compression or expansion purposes.

The main advantage of the decoder of the invention is that it can be adapted to any imaginable code law, of any one of the following classes:

Codes with increasing values, i. e. wherein the pulse of the group of coded pulses representing the binary order of rank $n-1$ is transmitted before the pulse representing the binary order of rank $n$.

Codes with decreasing values, i. e. wherein the pulse of the group of coded pulses representing the binary order of rank $n$ is transmitted before the pulse representing the binary order of rank $n-1$.

Codes with staggered values;

Codes with an irregular time distribution: by adjusting the locations of the taps on the delay line and the resistances corresponding to each tap.

Figure 2:
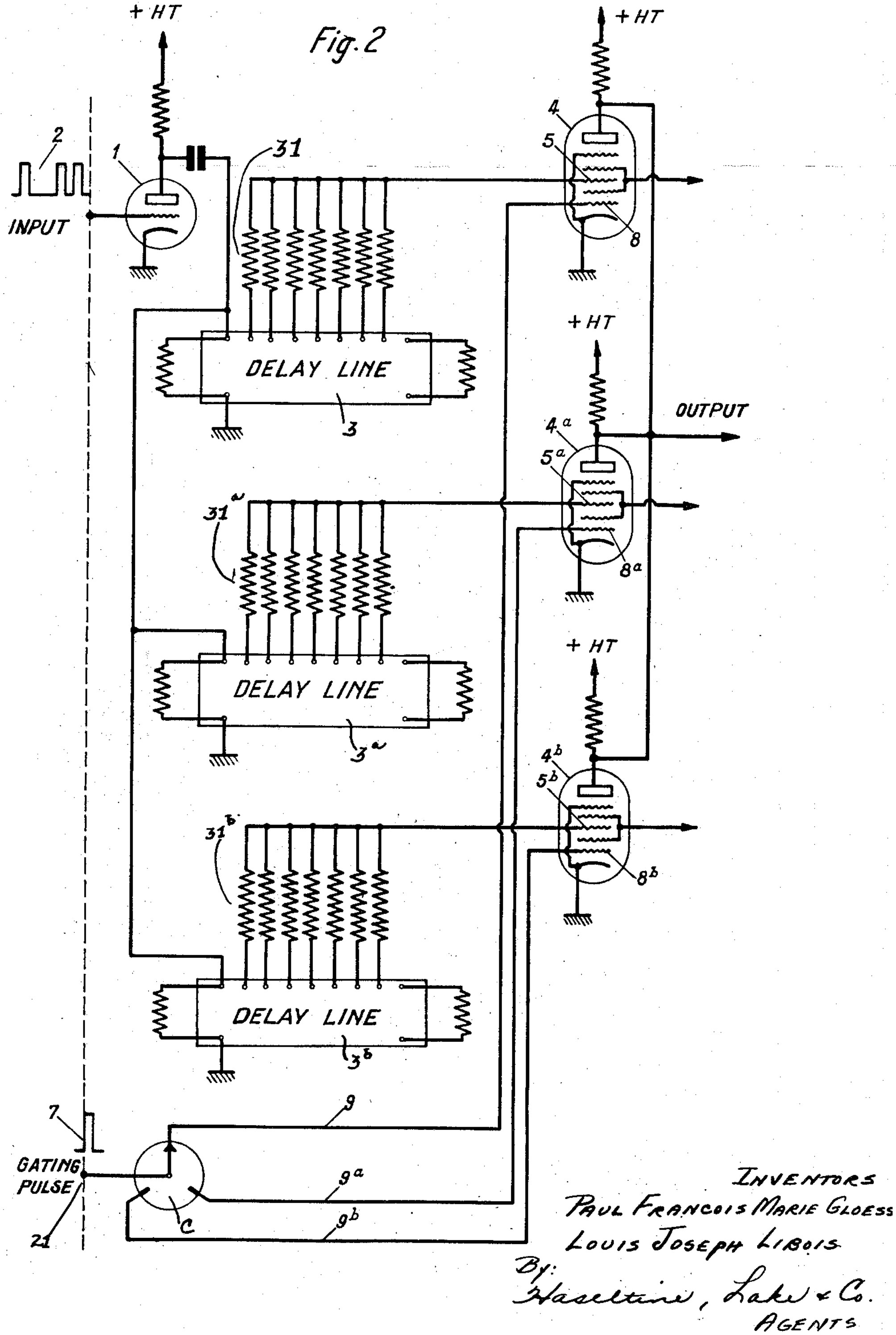
Figure 2 shows a more complex decoder for a code variable in time.

The same type of decoder is also convenient for the use of codes variable in time, either by acting on the values and/or the respective connections of the resistances 31 to 37 along the line 3, or by using, as shown on Figure 2, several assemblies, each comprising a delay line 3, 3$^a$, 3$^b$ . . ., a series of resistances such as 31, 31$^a$, 31$^b$, and a mixer tube 4, 4$^a$, 4$^b$ which is released by permutation, by applying the pulse 7 successively to the grids 8, 8$^a$, 8$^b$ . . . through the various connections 9, 9$^a$, 9$^b$ . . . C is a multiple-position switch allowing to direct at will the gating pulse 21 towards 8, 8$^a$, or 8$^b$.

After being impressed upon the grids 5, 5$^a$, 5$^b$ of tubes 4, 4$^a$, 4$^b$, the decoded signals can be received on a common output circuit by connecting the anodes of these tubes in parallel as shown on Figure 2.

We claim:

1. A device for translating intelligence represented by groups of coded electric voltage pulses into variable amplitude voltage pulses, each of said groups consisting of a constant integer number of successive voltage pulses of predetermined duration, each of said pulses being of one of two possible signalling conditions, said two conditions respectively being that of zero voltage, and that of a voltage of a predetermined amplitude and polarity, said device comprising a delay line having a propagation time at least equal to the duration of one of said groups, resistances for terminating both ends of said delay line so as to avoid signal reflection at said ends of said delay line, means for impressing said signals constituted by groups of coded pulses upon one end of said delay line, taps staggered along the length of said delay line at intervals related to time intervals between successive pulses pertaining to a same group, a plurality of resistances in a voltage dividing arrangement, each resistance being connected by one of its terminals to one of said taps on said delay line and by its other terminal to a common point, a gating amplifier, means for impressing voltage received at said common point upon the input of said gating amplifier, a pulse generator delivering recurrent control voltage pulses so as to render said gating amplifier operative only during predetermined recurrent time intervals, and means for impressing voltage received from the output of said gating amplifier upon a working circuit.

2. A device as claimed in claim 1, wherein the resistances are of high value compared to the characteristic impedance of the delay line.

3. A device as claimed in claim 1, including means causing the control pulses delivered to the gating amplifier to coincide in time with the duration of the last pulse in each group of coded pulses.

4. A device as claimed in claim 1, wherein the gating amplifier is constituted by a single electronic tube having at least a cathode, a control electrode, and an anode, and wherein the voltage received at the point common to all resistances is applied to said control electrode.

5. A device as claimed in claim 1, wherein the gating amplifier is constituted by a single electronic tube having at least a cathode, two control electrodes and an anode, and wherein the voltage received at the point common to all resistances is applied to one of said control electrodes while the control or gating voltage pulses are applied to the other of said control electrodes.

6. A device for translating intelligence represented by groups of coded electric voltage pulses into variable amplitude voltage pulses, each of said groups consisting of a constant integer number of successive voltage pulses of predetermined duration, each of said pulses being of one of two possible signalling conditions, said two conditions respectively being that of zero voltage and that of a voltage of a predetermined amplitude and polarity, said device comprising a delay line having a propagation time at least equal to the duration of one of said groups, resistances for terminating both ends of said delay line so as to avoid signal reflections at said ends of said delay line, means for impressing said signals constituted by groups of coded pulses upon one end of said delay line, taps staggered along the length of said delay line at intervals related to time intervals between successive pulses pertaining to a same group, a plurality of resistances of different values in a voltage dividing arrangement, each of said resistances having a value equal to the product of a given resistance value by a different integer power of the number two, each of said resistances being connected by one of its terminals to one of said taps on said delay line and by its other terminal to a common point, a gating amplifier, means for impressing voltage received at said common point upon the input of said gating amplifier, a pulse generator delivering recurrent control voltage pulses so as to render said gating amplifier operative only during predetermined recurrent time intervals, and means for impressing voltage received from the output of said gating amplifier upon a working circuit.

7. A device as claimed in claim 6, wherein the resistances are of high value compared to the characteristic impedance of the delay line.

8. A device as claimed in claim 6, including means causing the control pulses delivered to the gating amplifier to coincide in time with the duration of the last pulse in each group of coded pulses.

9. A device as claimed in claim 6, wherein the gating amplifier is constituted by a single electronic tube having at least a cathode, a control electrode, and an anode, and wherein the voltage received at the point common to all resistances is applied to said control electrode.

10. A device as claimed in claim 6, wherein the gating amplifier is constituted by a single electronic tube having at least a cathode, two control electrodes and an anode, and wherein the voltage received at the point common to all resistances is applied to one of said control electrodes while the control or gating voltage pulses are applied to the other of said control electrodes.

PAUL FRANÇOIS MARIE GLOESS.
LOUIS JOSEPH LIBOIS.

References Cited in the file of this patent

UNITED STATES PATENTS

| Number | Name | Date |
|---|---|---|
| 2,227,052 | White | Dec. 31, 1940 |
| 2,255,839 | Wilson | Sept. 16, 1941 |
| 2,401,405 | Bedford | June 4, 1946 |
| 2,453,461 | Schelleng | Nov. 9, 1948 |